US009921121B2

(12) United States Patent
Glaab et al.

(10) Patent No.: US 9,921,121 B2
(45) Date of Patent: Mar. 20, 2018

(54) PRESSURE MEASURING INSTRUMENT

(71) Applicants: WIKA Alexander Wiegand SE & Co. KG, Klingenberg (DE); WIKA Instrumentation Suzhou Co. Ltd., Suzhou (CN)

(72) Inventors: Holger Glaab, Goldbach (DE); Julian Huenerth, Elsenfeld (DE)

(73) Assignees: Wika Alexander Wiegand SE & Co. KG, Klingenberg (DE); Wika Instrumentation Suzhou Co., Ltd., Suzhou (CN)

( * ) Notice: Subject to any disclaimer, the term of this patent is extended or adjusted under 35 U.S.C. 154(b) by 222 days.

(21) Appl. No.: 14/822,414

(22) Filed: Aug. 10, 2015

(65) Prior Publication Data

US 2015/0362390 A1     Dec. 17, 2015

Related U.S. Application Data

(63) Continuation of application No. PCT/CN2014/071890, filed on Feb. 7, 2014.

(30) Foreign Application Priority Data

Feb. 8, 2013   (DE) .................. 10 2013 202 090

(51) Int. Cl.
*G01L 9/12*    (2006.01)
*G01L 9/00*    (2006.01)
*G01L 19/14*   (2006.01)

(52) U.S. Cl.
CPC ............ *G01L 9/0041* (2013.01); *G01L 9/008* (2013.01); *G01L 9/0051* (2013.01);
(Continued)

(58) Field of Classification Search
CPC ..... G01L 9/008; G01L 9/0051; G01L 19/142; G01L 19/147
(Continued)

(56) References Cited

U.S. PATENT DOCUMENTS 4,630,833 A * 12/1986 Boyle et al. ........... F16J 15/166
277/322
6,382,738 B1 * 5/2002 Bayer et al. .......... B60T 8/3675
303/119.2
(Continued)

FOREIGN PATENT DOCUMENTS

CN      2280896 Y    5/1998
CN      2754076 Y    1/2006
(Continued)

*Primary Examiner* — Lisa Caputo
*Assistant Examiner* — Roger Hernandez-Prewitt
(74) *Attorney, Agent, or Firm* — Muncy, Geissler, Olds & Lowe, P.C.

(57) ABSTRACT

A pressure measuring instrument having a sensor carrier, a casing, a plug connector, evaluation electronics, and a pressure sensor. The sensor carrier supports the pressure sensor adapted to output a pressure-proportional, electrically detectable pressure signal. The sensor carrier has a base body, a pressure terminal formed together with the base body to be connected to the source of the pressure to be detected, and a seat having several different circle geometries, each having an annular surface adapted for mounting a pressure sensor. The pressure terminal has a connecting channel opening inside the seat, and the annular surfaces of the individual circle geometries are axially staggered with respect to the port of the connecting channel, wherein the annular surface having the smallest diameter is closest to the connecting channel port.

16 Claims, 2 Drawing Sheets

(52) U.S. Cl.
CPC .......... *G01L 9/0072* (2013.01); *G01L 19/142* (2013.01); *G01L 19/147* (2013.01)

(58) Field of Classification Search
USPC .................................................. 73/705–719
See application file for complete search history.

(56) References Cited

U.S. PATENT DOCUMENTS

| | | | |
|---|---|---|---|
| 7,000,478 B1* | 2/2006 | Zwollo et al. ........... | G01K 1/08 374/E1.011 |
| 7,064,671 B2 | 6/2006 | Vanderah et al. | |
| 7,467,891 B2* | 12/2008 | Gennissen et al. .... | G01K 13/02 374/141 |
| 2014/0144244 A1* | 5/2014 | Jones et al. ........... | G01L 19/143 73/754 |

FOREIGN PATENT DOCUMENTS

| | | |
|---|---|---|
| CN | 1866145 A | 11/2006 |
| JP | H 09-5196 A | 1/1997 |

* cited by examiner

PRESSURE MEASURING INSTRUMENT

This nonprovisional application is a continuation of International Application No. PCT/CN2014/071890, filed on Feb. 7, 2014, which claims priority to German Patent Application No. DE 10 2013 202 090.2, filed in Germany on Feb. 8, 2013, both of which are herein incorporated by reference.

BACKGROUND OF THE INVENTION

Field of the Invention
The invention relates to a pressure measuring instrument.
Description of the Background Art
A conventional pressure measuring instrument includes a sensor carrier on which a pressure sensor is mounted. Generally, the pressure sensor is mounted on the sensor carrier such that it may separate two different pressure chambers from each other.

One of the pressure chambers is usually assigned a pressure connector at the sensor carrier, while the other pressure chamber is formed e.g. by the environment. The pressure sensor may also include a closed off volume which forms one of the pressure chambers. The pressure sensor provides a signal that is proportional to the pressure difference between the two pressure chambers. The signal is processed by an evaluation electronics and, as the case may be, is displayed at the pressure measuring instrument itself or after remote transmission.

There is a plurality of pressure sensors that are differently shaped and also constructed differently in technical respect. So far, it has been common practice to assemble a pressure measuring instrument from a pressure sensor and a matching sensor carrier and to then equip this system with the further components. However, this system has the disadvantage that a corresponding number of different sensor carrier types must be kept in stock in order to be able to assemble a pressure measuring instrument suitable for certain measuring tasks.

SUMMARY OF THE INVENTION

It is therefore an object of the present invention to provide a pressure measuring instrument that can be used for several measuring tasks and/or can be adapted to the latter during manufacturing.

A pressure measuring instrument according to an embodiment of the invention comprises a sensor carrier, a casing, a plug connector, an evaluation electronics and a pressure sensor, wherein the sensor carrier comprises a tool application surface mounted on the outside, a pressure terminal mounted on the one side for pressure-tightly connecting the sensor carrier to a process connection, and a seat molded on the side facing away from the pressure terminal for at least two pressure sensors.

Due to the sensor carrier's design according to an embodiment of the invention, it is now possible to use two different types of pressure sensors having the same sensor carrier so that the variety of parts to be kept in stock is reduced and/or the adaptability of the pressure measuring instrument to be manufactured to the respective pressure measuring task is simplified. So, a pressure sensor that is particularly suited for a certain measuring task can be connected to the one seat for a pressure sensor. If the measuring instrument is to be used for another measuring task for which another pressure sensor is better suited, the latter can be fitted in the respective other seat for a pressure sensor in the sensor carrier.

The seats can have two different circle geometries so that two different pressure sensors may be fitted. As a matter of course, also shapes other than the circular shape are conceivable. The circular shape has an advantage in that the fitting position of the pressure sensor on its seat does not play a role if the pressure sensor is designed in a circular shape, as well.

A pressure measuring instrument according to an embodiment of the invention can have a sensor carrier, a casing, a plug connector, an evaluation electronics and a pressure sensor, wherein the sensor carrier carries the pressure sensor which is adapted to output a pressure-proportional, electrically detectable pressure signal. The sensor carrier can have a base body, a pressure terminal formed together with the base body for connection with the source of the pressure to be detected, and a seat having several different circle geometries, each having an annular surface adapted for mounting a pressure sensor. The pressure terminal can have a connecting channel opening inside the seat and the annular surfaces of the individual circle geometries are axially staggered with respect to the connecting channel port, wherein the annular surface having the smallest diameter is closest to the connecting channel port.

In the pressure measuring instrument according to an embodiment of the invention, the annular surfaces that are designed for accommodating and connecting a pressure sensor therewith, respectively, can be formed at the sensor carrier at a different diameter. Moreover, an axial staggering of the annular surfaces can be selected here, with the annular surface having the smallest diameter being arranged closest to the sensor carrier and further annular surfaces can be provided at an increasing distance from the base body of the sensor carrier as their diameter increases.

The circle geometries of the seat can be cylindrical wall portions that are integrally molded on or formed with the sensor carrier. In this manner, it may be achieved that at least the cylindrical wall portions can be connected to the sensor carrier in a gas-tight manner.

Further, the circle geometries can be arranged as concentric circular rings or ring shoulders around the connecting channel port, and the outer circular ring is arranged to be higher than the inner circular ring.

The pressure measuring instrument can have annular surfaces for abutment with the respective pressure sensor and guiding portions formed in connection with the annular surfaces, for example, in the shape of a ring bulge surrounding the outer periphery of the respective annular surface so that, during the mounting, the respective pressure sensor can be guided into a predetermined abutment position with the respectively allocated annular surface. In other words, the seat for the pressure sensor can be adapted to guide the pressure sensor into its target position so that the connection with the sensor carrier can easily be effected.

According to an embodiment of the invention, a pressure measuring instrument can be further provided that has a sensor carrier, a casing, a plug connector and an evaluation electronics configured to be connected to two different pressure sensors. The sensor carrier can comprise a tool application surface mounted on the outside, a pressure terminal mounted on the one side for a pressure-tight connection of the sensor carrier with a process connection, and a seat molded on the side facing away from the pressure terminal for at least two different pressure sensors, which have pressure-sealing welding geometries that are different in diameter. The casing can have a cylindrical shape and can have an adjusting ring on the outside which is slidably and/or twistably mounted and can have a magnet, wherein a sensor coupled to the evaluation electronics can be adapted to detect the position of the magnet relative to the sensor.

In this manner, a pressure measuring instrument according to an embodiment of the invention may be designed such that the casing and the sensor carrier can jointly form a hermetically closed off space in which the pressure sensor and the evaluation electronics can be arranged. Nevertheless, it is possible to achieve an adjustability of the sensor by transferring magnetic forces through the wall of the casing, and by a corresponding sensor technology on the evaluation electronics.

The adjustability can relate to different sensor parameters; these may be, for example, zero point, range, reference points or switching threshold points. In order to prevent an undesired adjustment of the pressure measuring instrument, the adjusting ring may be designed such that it can be fixed to a prolongation on the casing or on a part closing off the casing after acting on the evaluation electronics in the desired way. In this manner, it is possible to design the pressure measuring instrument to be adjustable without tools and to still prevent an undesired adjustment.

The casing can be made of plastic and/or stainless steel, for example, as a deep drawn piece. This is not only inexpensive but allows a good passage of magnetic fields of force that are to act on the evaluation electronics.

The seat of the sensor carrier can be designed and configured to be welded with the pressure sensor. For example, this may be suitable chamfers, projections, protrusions, rims, bulges that are respectively deformed or connected with the pressure sensor during welding.

The pressure measuring instrument may be designed such that the sensor carrier can be made of stainless steel. This material is robust, corrosion-resistant and also well weldable.

The pressure sensor can be, for example, a thin film sensor, a piezoelectric sensor, a ceramic seal film sensor or thickfilm sensor or a capacitive sensor. The sensors can be selected in accordance with their field of application and their strengths and weaknesses in the respective field of application.

A stepped bore can be formed in the pressure terminal for pressure-tightly connecting the sensor carrier which serves the pressure-tight connection to an applicator of a test pressure. For example, this is a pin having a conic tip and an internal bore on which the pressure measuring instrument is placed so that the conic tip of the pin rests on the edge of a step of the stepped bore in the pressure terminal and sufficiently seals there for the testing.

The pressure terminal may have a pressure throttle for pressure-tightly connecting the sensor carrier; the pressure throttle may be press-fitted into a suitable bore in the pressure terminal on the pressure terminal side. Other forms of inserting the pressure throttle are of course possible, as well.

A circumferential step can be molded on the pressure terminal for pressure-tightly connecting the sensor carrier; a diaphragm can be welded to the circumferential step. This diaphragm may serve for separating the substance whose pressure is to be measured and the pressure sensor.

The sensor carrier may include a support structure which is designed integrally with the sensor carrier and particularly in a circular shape, and which forms a rest for a module of the evaluation electronics that is spaced apart from the seat for the pressure sensors.

The evaluation electronics can be composed of at least two modules, wherein one module can be adapted to be varied, respectively, depending on the construction variant of the pressure sensor and differs by the design and/or the construction. The two modules are urgeable/pressable against each other and against the sensor carrier via an elastic component which can be adapted to rest on the casing, wherein at least one module can include a board having a through-hole for passing contacting wires to the pressure sensor.

Further, an evaluation electronics can be designed in two parts such that one part may always remain the same while the other part of the electronics is adapted to the respective pressure sensor. Thus, also the storage of electronic components can be reduced. The one board that always remains the same only has to be available in stock in the number of pressure measuring instruments to be manufactured while, before, the electronic components of said board or said module had to be available in stock in the number of possible variants.

Via a plug system, the modules of the evaluation electronics can be plugged together, wherein the evaluation electronics plugged together such is held on the support structure of the sensor carrier on the one hand and by the electronic component on the other hand and is also made to engage with the plug connector. In this manner, a shock-resistant, secure connection and fastening of the two modules is ensured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
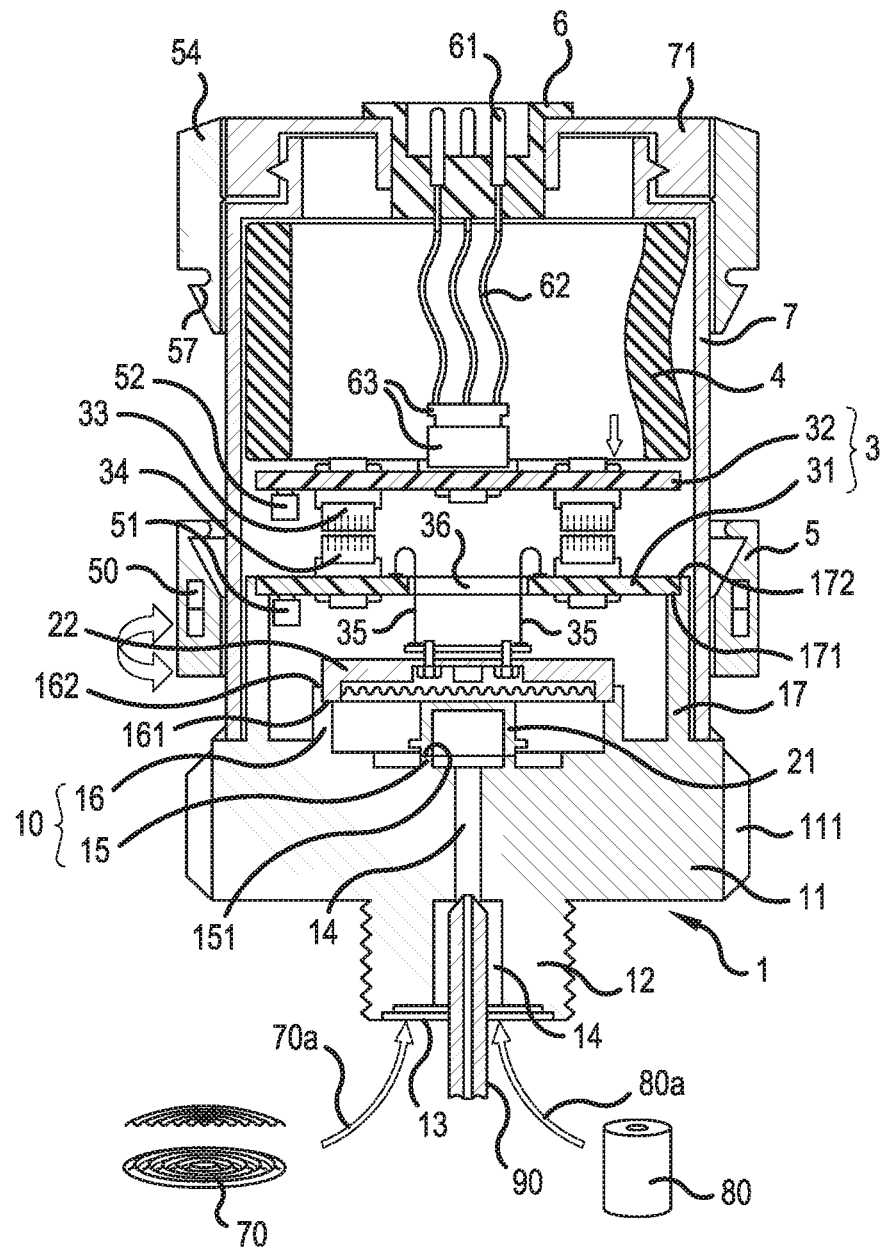
FIG. 1 illustrates an exemplary embodiment, showing a cross-sectional view of an adjustment fitting with a sealing of the eccentric receiving space.

FIG. 1 shows a sectional view of a pressure measuring instrument according to an exemplary embodiment of the invention. A sensor carrier 1 at the bottom of FIG. 1 has a base body 11 and a pressure terminal 12. At the outer periphery of the base body 11, a tool application portion 111 is mounted. The base body 11 of the sensor carrier 1 is passed through by a connecting channel 14 which, on the one hand, is connected to the pressure terminal 12 and, on the other hand, to the seat 10 on the other side of the sensor carrier 1.

Figure 2:
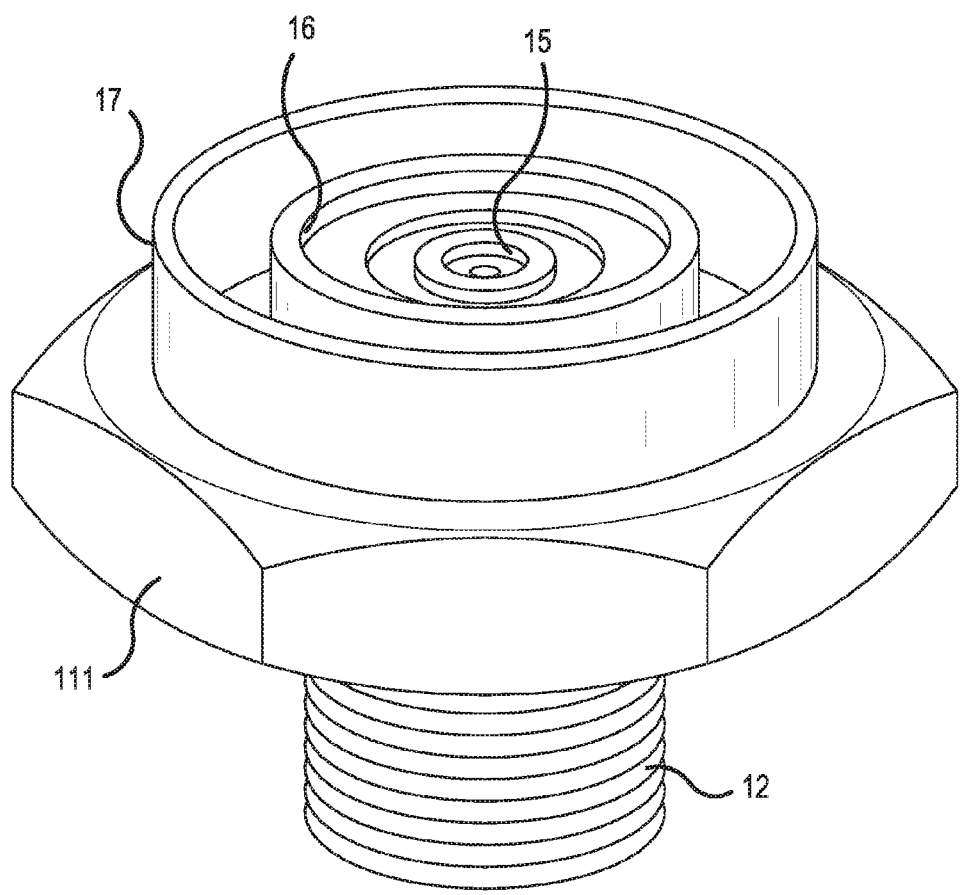
FIG. 2 illustrates a perspective view of the base body 11 of FIG. 1.

In detail, FIG. 1 shows a ring shoulder 15 that is concentrically surrounded by a ring shoulder 16, wherein the ring shoulders 15 and 16 together form the seat 10. The front faces of the two ring shoulders 15, 16 are annular surfaces 151 and 161. A perspective view of the base body 11 showing the different circle geometries of the ring shoulders 15 and 16 is provided in FIG. 2.

On the side facing away from the pressure terminal 12, the sensor carrier 1 has a casing 7 placed thereon that is closed by a lid 71. The lid 71 has a plug connector 6 including plug contacts 61. The plug connector 6 is inserted as an inset into the lid 71 in a gas-tight manner. In turn, the lid 71 is connected to the casing 7 in a gas-tight manner. The sensor carrier 1 has an annular surface 151 on its ring shoulder 15, the annular surface 151 facing the interior of the casing 7. Here, in FIG. 1, a pressure sensor 21 which is hat or cup-shaped is placed on the annular surface 151 of the ring shoulder 15. The measuring members in the form of resistances are placed for instance on the casing-side surface of the cup bottom. These may be sputtered or mounted in another manner as resistances in thin film technology.

The ring shoulder 16 having the larger diameter concentrically surrounds the ring shoulder 15. The ring shoulder 16 is, in its axial direction, longer than the ring shoulder 15 and projects further toward the casing 7 from the sensor carrier 1 than the ring shoulder 15. At its axial front face, the ring shoulder 16 forms an annular surface 161 which is surrounded by a ring bulge 162. These elements are clearly visible in FIG. 1. A pressure sensor 22 inserted into seat 10 is dimensioned such that it comes to rest on the annular surface 161 of the ring shoulder 16 with its front face, while the ring bulge 162 projecting over the annular surface 161 of the ring shoulder 16 takes over a lead function, i.e. the pressure sensor 22 is held in its target position. At the same time, the ring bulge 162 serves as welding edge and may be prepared accordingly.

FIG. 1 further shows a support structure 17 that extends from the sensor carrier 1 toward the casing 7 also as circular cylindrical ring shoulder. In FIG. 1, it can well be seen that a board 31 that forms part of the evaluation electronics is inserted into the support structure 17. In a similar design as the ring shoulder 16, the support structure 17 has an annular surface 171 and a ring bulge 172 surrounding the annular surface 171. The ring bulge 172 provides for the resting board 31 to be held in its position on the support structure 17, preferably laterally. Via connecting wires 35 that are guided in the board 31 through a through-hole, the pressure sensor 22 is connected to the evaluation electronics 3. The board 31 which forms a module of the evaluation electronics 3 is assigned a further board 32 which forms a further module of the evaluation electronics 3. Plug connectors 33, 34 establish the electric connection between the boards 31 and 32 of the evaluation electronics 3. Additionally, the plug connectors 33, 34 also have the function of guiding the second board 32 in a lateral manner with respect to the first board 31.

An elastic component 4 is placed on the second board 32 and rests on a portion of the casing 7. The dimensions of the component 4, of the casing 7 and of the support structure 17 as well as of the boards 31 and 32 are chosen such that, in the finished state, the elastically deformable component 4 urges the second board 32 (second module) against the first board 31 (first module) which is then pressed into its position on the support structure 17.

Approximately in the centre of FIG. 1, an adjusting ring 5 is indicated, said ring being mounted slidably and twistably on the casing 7. The adjusting ring 5 contains one or several magnets 50 which may interact through the casing wall with sensor 51 on the first board 31 or sensor 52 on the second board 32. By moving the magnet by means of the adjusting ring 5 supporting the latter, the sensors 51 and 52 may be influenced such that they can be used for programming the evaluation electronics 3. In this manner, e.g. zero points, switching threshold points, measure value ranges or the like can be set.

The solution of FIG. 1 shows that, once the pressure measuring instrument has been adjusted, the adjusting ring 5 in FIG. 1 can be moved upwards until it engages with the allocated support member 54 by a latch 57. In this manner, the adjusting ring is held in a position in which it can no longer influence the settings of the pressure measuring instrument. The latch 57 is designed such that the adjusting ring latches in a non-detachable manner. In an alternative design, the adjusting ring may have a latch that lets it come clear e.g. when sufficient force is applied, so that it may then be used for setting the pressure measuring instrument. So, the pressure measuring instrument contains the component for setting but a specific course of action is required to restore the adjustability. Thus, after the desired setting, an undesired adjusting of the pressure measuring instrument may be prevented. At the same time, the adjustability of the pressure measuring instrument is achieved without any tools being required.

Further, it can be recognized in FIG. 1 that the evaluation electronics 3 including its two boards 31 and 32 is connected to the plug connector 6 via lines 62. The lines lead to the plug contacts 61 and are fixed there in the usual manner. Preferably, a plug connector 63 including a latch is provided between the board 32 and the wires 62.

The casing 7 is preferably made of stainless steel; the lid 71 and the support member 54 including the latch 57 are preferably made of plastic. Plastic is insulating, lets magnetic fields pass easily and is otherwise very easy to be shaped.

The sensor carrier 1 can be made of stainless steel. This material can be well processed, is robust, can be welded easily and, not least, provides the device with a permanent high-quality look.

Above, an embodiment of the pressure measuring instrument according to the invention has been described in detail. Different modifications are possible. Particularly, e.g. a diaphragm 70 may be inserted in the pressure terminal 12, as shown by arrow 70a, for separation of the substance to be measured and be welded therewith. For this purpose, a stepped bore 13 is provided. Also, the pressure terminal 12 may have a pressure throttle 80 for pressure-tightly connecting the sensor carrier 1; the pressure throttle 80 may be press-fitted into the stepped bore 13, as shown by arrow 80a, in the pressure terminal 12 on the pressure terminal side. Furthermore, the stepped bore 13 can be provided for pressure-tightly connecting the sensor carrier 1 to an applicator 90 of a test pressure for testing.

The tool application portion may be a hexagon, a square or also another shape of the tool application portion which may be formed such that it is detachable only by means of special tools.

Above, a hermetically closed casing 7 has been described together with the sensor carrier 1. The casing, preferably the lid, has an orifice including a diaphragm and can also be connected to the environment by means thereof. For this purpose, a small orifice suffices so as to ensure that there is ambient pressure in the casing. This orifice may be closed by a material that lets gas pass but not humidity, e.g. a PTFE diaphragm.

Pressure sensors that are not dependent on the interior pressure of the casing may be used as well, similar to the pressure sensor 22 shown in FIG. 1, in which the diaphragm separates a gas chamber including a sensor that may be filled with a desired pressure.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pressure measuring instrument comprising:
   a sensor carrier;
   a casing mounted on the sensor carrier, the casing being closed by a lid;
   a plug connector mounted in the lid of the casing;
   evaluation electronics provided inside of the casing; and
   a pressure sensor,
      wherein the sensor carrier comprises:
         a tool application surface mounted on an outside of the sensor carrier;
         a pressure terminal mounted on a side for pressure-tightly connecting the sensor carrier to a process connection; and
         two seats molded on a side facing away from the pressure terminal for at least two pressure sensors, and
      wherein the two seats each have a different circle geometry and are each adapted to receive one of two geometrically different pressure sensors.

2. The pressure measuring instrument according to claim 1, wherein the pressure sensor is a thin-film sensor, a piezoelectric sensor, a ceramic thick-film sensor, or a capacitive sensor.

3. The pressure measuring instrument according to claim 1, wherein the evaluation electronics comprises at least two modules, wherein one module is adapted to be varied, respectively, depending on the construction variant of the pressure sensor and differs by the design and/or construction, wherein the two modules are pressable against each other and against the sensor carrier by an elastic member which is adapted to particularly rest on the casing and/or wherein at least one module comprises a board having a through-hole for passing contacting wires to the pressure sensor.

4. A pressure measuring instrument comprising:
   a sensor carrier;
   a casing mounted on the sensor carrier, the casing being closed by a lid;
   a plug connector mounted in the lid of the casing;
   evaluation electronics provided inside of the casing; and
   a pressure sensor,
   wherein the sensor carrier carries the pressure sensor, which is adapted to output a pressure-proportional, electrically detectable pressure signal,
   wherein the sensor carrier has a base body, a pressure terminal formed together with the base body for connection with a source of the pressure to be detected, and two seats each having a different circle geometry, each of the two seats having an annular surface adapted for mounting one of two geometrically different pressure sensors, and
   wherein the pressure terminal has a connecting channel opening inside the two seats, the annular surfaces of the individual circle geometries being axially staggered with respect to the connecting channel port, and the annular surface having a smallest diameter being arranged closest to the connecting channel port.

5. The pressure measuring instrument according to claim 4, wherein the circle geometries are cylindrical wall portions integrally molded on the sensor carrier.

6. The pressure measuring instrument according to claim 4, further comprising a guiding portion formed in connection with one of the annular surfaces, the guiding portion being an annular bulge surrounding an outer periphery of the one of the annular surfaces, wherein the guiding portion guides the respective pressure sensor into a predetermined abutment position with the one of the annular surfaces via an outer periphery of the pressure sensor.

7. A pressure measuring instrument comprising:
   a sensor carrier;
   a casing mounted on the sensor carrier, the casing being closed by a lid;
   a plug connector mounted in the lid of the casing;
   evaluation electronics provided inside of the casing; and
   a pressure sensor,
   wherein the sensor carrier carries the pressure sensor, which is adapted to output a pressure-proportional, electrically detectable pressure signal,
   wherein the sensor carrier has a base body, a pressure terminal formed together with the base body for connection with a source of the pressure to be detected, and a two seats each having a different circle geometry, each of the two seats having an annular surface adapted for mounting a pressure sensor,
   wherein the pressure terminal has a connecting channel opening inside the two seats, the annular surfaces of the individual circle geometries being axially staggered with respect to the connecting channel port, and the annular surface having a smallest diameter being arranged closest to the connecting channel port, and
   wherein the circle geometries are arranged as concentric circular rings around the connecting channel port, and wherein the outer circular ring is higher than an inner circular ring.

8. A pressure measuring instrument comprising:
   a sensor carrier;
   a casing mounted on the sensor carrier, the casing being closed by a lid;
   a plug connector mounted in the lid of the casing; and
   evaluation electronics, provided inside of the casing, and configured to be connected to two different pressure sensors,
   wherein the sensor carrier comprises:
      a tool application surface mounted on an outside of the sensor carrier;
      a pressure terminal mounted on a side for a pressure-tight connection of the sensor carrier with a process connection; and
      two seats molded on a side facing away from the pressure terminal for at least two different pressure sensors that have pressure-sealing welding geometries that are different in diameter,
   wherein the casing has a cylindrical shape, and has an adjusting ring slidably and/or twistably mounted on an outside thereof, the adjusting ring having a magnet attached therein, and
   wherein a sensor coupled to and positioned on an inner circuit board of the evaluation electronics is adapted to detect the position of the magnet relative to the sensor.

9. The pressure measuring instrument according to claim 8, wherein the adjusting ring is made of plastic.

10. The pressure measuring instrument according to claim 8, wherein, depending on the pressure sensor, the adjusting ring adjustably assigns different sensor parameters to the evaluation electronics, including zero point, range, reference points, or switching threshold points.

11. The pressure measuring instrument according to claim 8, wherein the two seats are welded to the pressure sensor.

12. The pressure measuring instrument according to claim 8, wherein the sensor carrier is made of stainless steel.

13. The pressure measuring instrument according to claim 8, wherein a stepped bore, used for pressure-tightly contacting an applicator of a test-pressure, is formed in the pressure terminal for pressure-tightly connecting the sensor carrier.

14. The pressure measuring instrument according to claim 8, wherein a pressure throttle is inserted or press-fitted in the pressure terminal for pressure-tightly connecting the sensor carrier.

15. The pressure measuring instrument according to claim 8, wherein a circumferential step to which a diaphragm is weldable, is molded on the pressure terminal for pressure-tightly connecting the sensor carrier.

16. The pressure measuring instrument according to claim 8, further comprising a circular-cylindrical support structure integrally formed with the sensor carrier and having a support spaced apart from the two seats, the support provided for mounting the inner circuit board of the evaluation electronics.

* * * * *